Inventor
Erling Klafstad

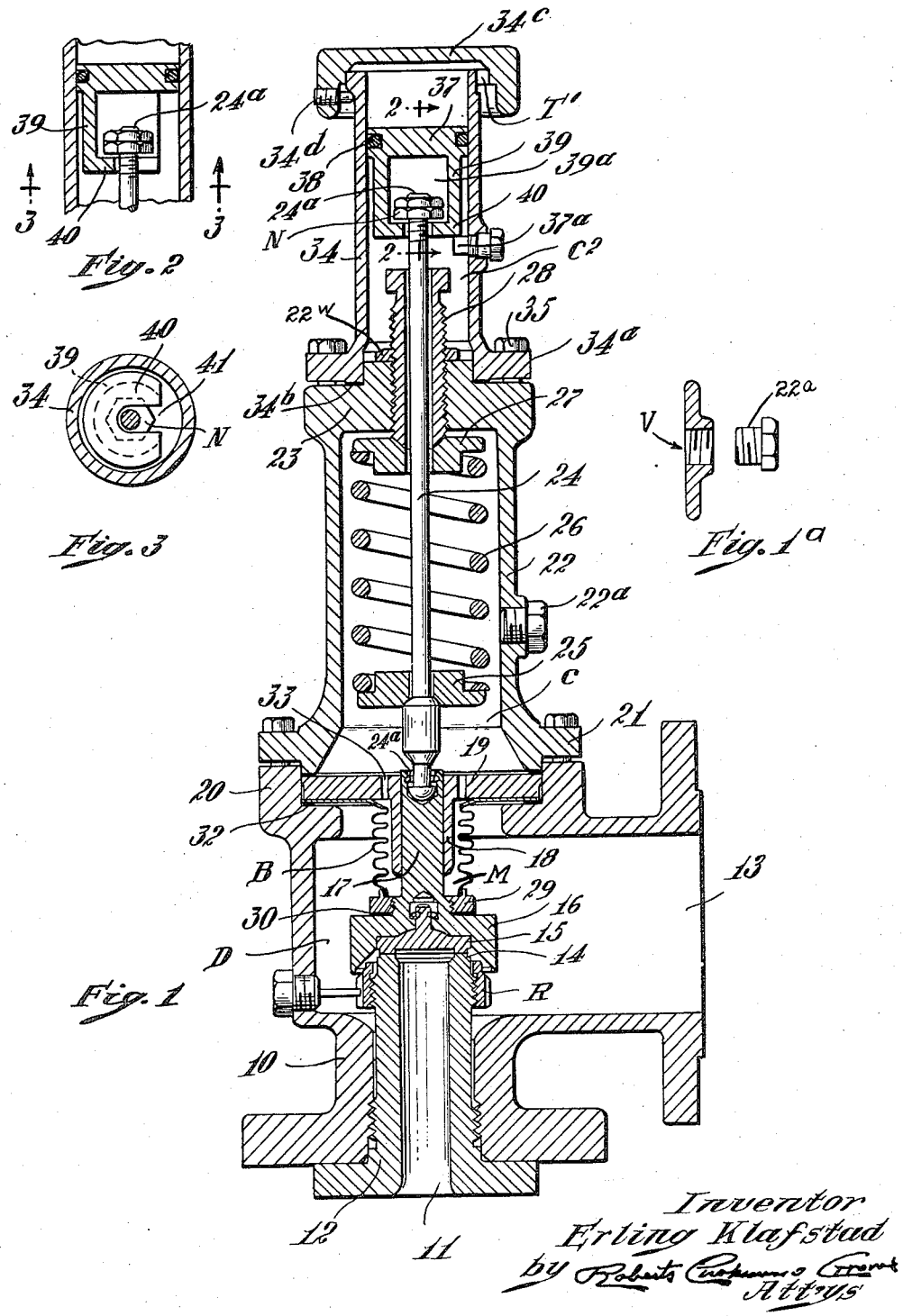

United States Patent Office 2,878,828
Patented Mar. 24, 1959

2,878,828

BALANCED BELLOWS VALVE FOR BACK-PRESSURE SERVICE WITH SUPPLEMENTARY MEANS FOR NON-VENTED BONNETS

Erling Klafstad, Trumbull, Conn., assignor to Manning, Maxwell & Moore, Incorporated, Stratford, Conn., a corporation of New Jersey Application February 15, 1957, Serial No. 640,438

32 Claims. (Cl. 137—478)

This invention pertains to a spring-loaded top safety valve of the kind having fixed guide means, located above the level of the top of the valve inlet nozzle, for guiding the valve disk during its entire travel and relates more particularly to a valve having protective means designed to prevent pressure fluid, for example that which is released when the valve opens, from escaping into the outside space immediately surrounding the valve or into the pressure-tight (closed non-vented) type bonnet, for instance through the clearance space between the stem portion of the valve holder and said guide means. Not only does superatmospheric pressure within the valve casing result from the lift of the valve disk from its seat, but when several valves are connected into the same discharge header, and particularly if the header be long or of insufficient capacity, the opening of one valve may result in creating back-pressure within the casings of the valves which still remain closed.

Valves provided with such protective means as above suggested are commonly employed when the pressure fluid is of a kind, for instance, corrosive, poisonous or of an otherwise hazardous nature such as would be injurious or detrimental to personnel or neighboring apparatus.

Obviously, the protective means employed must be such as will not seriously interfere with the intended functioning of the valve. One conventional arrangement for obtaining the desired result is to connect the movable valve head or disk to a fixed part of the valve casing by means of a metallic protective bellows coaxial with the valve stem and which, while allowing free motion of the valve disk from or toward its seat, effectively prevents pressure or pressure fluid released by the opening of the valve or otherwise created within the valve casing, from being communicated to the space within the valve bonnet. The effective area of the protective bellows thus provided has usually been roughly equivalent to the area of the valve seat.

Since this protective bellows is attached, leak-tight, at its lower end to the valve disk (or to a holder for the valve disk) and at its upper end is secured leak-tight to a part of the valve casing, the space within the bellows defines a chamber, the floor of which is formed by the valve disk or a part, for instance a valve holder, which moves up or down with the valve disk but which communicates with the interior of the bonnet by ports or passages. When hereinafter reference is made to the connection of the lower end of the protective bellows to the valve disk, such expression is to be interpreted as meaning either the valve disk itself or the holder for the valve disk, the holder and valve disk moving up or down as a unit.

Because of the trouble and expense of providing for the conduct of pressure fluid from the valve bonnet to some safe place, it is desirable to employ a valve having a non-vented bonnet; but, if in such a valve, the protective bellows be broken or even developed a pin-hole leak, pressure fluid at super-atmospheric pressure enters the chamber within the bellows and, acting upon the floor of the bellows, creates an abnormal downward force which is added to the spring load and thus has the same effect as though the valve were set to open at a higher pressure.

At times, for example when the valve is open or even under some circumstances, such as previously suggested regardless of whether the valve be open or closed, a substantial pressure may exist in the space within the valve casing and surrounding the bellows. If, under such conditions (the safety valve being of the so-called non-vented bonnet type), the bellows should develop a leak, the pressure or pressure fluid within the valve casing will enter the bellows and exert a downward force such as to modify the operation of the valve, for example, to delay its opening beyond a safe pressure.

The present invention has for one of its objects the provision of a spring-loaded, non-vented bonnet type pop safety valve so devised as normally to prevent the pressure fluid from entering the valve bonnet, but with the further object of preventing the fortuitous building up of pressure within the pressure-tight bonnet from interfering with the intended functioning of the valve. Such building up of pressure within the bonnet may ordinarily occur in valves of this type by reason of leakage in or complete failure of the protective bellows. A further object of the invention is to provide a spring-loaded pop safety valve, including a bellows which normally prevents entry of the pressure fluid into the valve bonnet, but with provision for neutralizing the effects upon valve operation of any abnormal pressure which may develop within the bellows. A further object is to provide a spring-loaded pop safety valve having an element which is subjected to any abnormal pressure which may develop within the bellows and which is operative to counteract the effect of such pressure (within the bellows) upon the upper surface of the valve disk, but without permitting pressure fluid to escape from the interior of the bellows to the atmosphere. A further object is to provide a spring-loaded pop safety valve having a bellows which normally prevents the entry of pressure fluid into the valve bonnet and having a movable part, attached to the valve spindle outside of the bonnet proper, which is exposed to any abnormal fluid pressure which may develop within the bellows and which is effective to exert on the valve spindle a force substantially equal to any force exerted in the opposite direction by pressure subsisting within the valve casing above the valve disk.

As one means of automatically neutralizing abnormal pressure within the bellows of a valve of the above type, if the bellows develop a leak, it has heretofore been proposed to arrange a piston to slide in a cylindrical guiding bore provided in a conventional vented bonnet at a point below the loading spring and so connected to the valve spindle, that upon rupture of the protective bellows the piston acts to neutralize abnormal fluid pressure acting upon the upper surface of the valve disk. However, while a piston so located is operative for the intended purpose, its location at this particular point makes it necessary to vent the bonnet, for if the bonnet be completely closed, the fluid pressure above such a piston would interfere with its intended function. Since one of the primary purposes of the protective bellows is to prevent the escape of pressure fluid into the near surroundings of the valve, it is necessary, if the bonnet be vented, to provide pipe connections for carrying away to some safe place any pressure fluid which escapes through the bonnet vent. However, such a pipe when not discharging fluid from the interior of the bonnet (which would be the normal condition) may permit the entry of air carrying corrosive substances into the bonnet with consequent damage to the spring. Air in the vicinity of oil refineries often carries such corrosive substances, for example hydrogen sulphide or sodium chloride. Moreover when the balancing piston is located within the bonnet and below the loading spring, any repairs to the balancing piston or to parts associated therewith necessitates shutting off the supply of pressure fluid to the valve and the disassembling of the valve structure. A further object of the present invention is to provide balancing means so constructed and arranged that it may be removed for repair or replacement without disturbing the loading spring adjustment and without cutting off the supply of fluid to the valve.

In bellows valves wherein a pressure compensating piston has been employed, it has been proposed to provide the piston with O-rings to prevent leakage, but such rings made of the materials usually employed may lose their effectiveness if subjected to temperatures above 450° F. A further object of the invention is to provide a pressure-compensating means for a bellows type valve which retains its normal effectiveness even though the temperature of the fluid at the inlet side of the valve substantially exceeds 450° F. A further object is to provide balancing means which in no way affects the normal operation of the valve and which only comes into action if the protective bellows develops a leak. A further object of the invention is to provide a valve of the above type wherein, if desired, the balancing means may be located wholly outside of the bonnet proper, for example, within a cap mounted upon the bonnet proper. A further object is to provide balancing means so devised that it may be applied to a conventional valve without substantial modification of the latter. A further object is to provide a bellows valve of the above type whose normal function, whether the bellows be intact or is ruptured, will not be substantially affected by back-pressure within the valve casing. Other and further objects and advantages of the invention will be pointed out in the following more detailed description and by reference to the accompanying drawings, wherein:

Fig. 1 is a central vertical section showing a spring-loaded pop safety valve of the type described embodying the present invention, wherein a piston is employed as the means for neutralizing any force exerted on the upper surface of the valve disk by abnormal fluid pressure within the protective bellows;

Fig. 1ª is a fragmentary radial section through the valve bonnet showing the vent hole with the plug removed;

Fig. 2 is a fragmentary vertical section on the line 2—2 of Fig. 1;

Fig. 3 is a horizontal section on the line 3—3 of Fig. 2;

Figure 9:
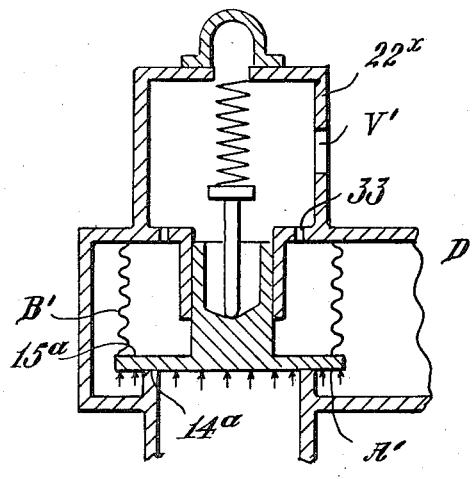
Fig. 9 is a diagrammatic vertical section, showing a bellows-type valve wherein the area of the bellows floor exceeds the area of the valve seat.
Figure 11:
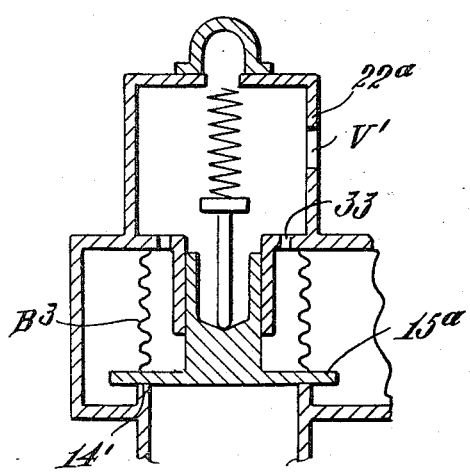
Figure 12:
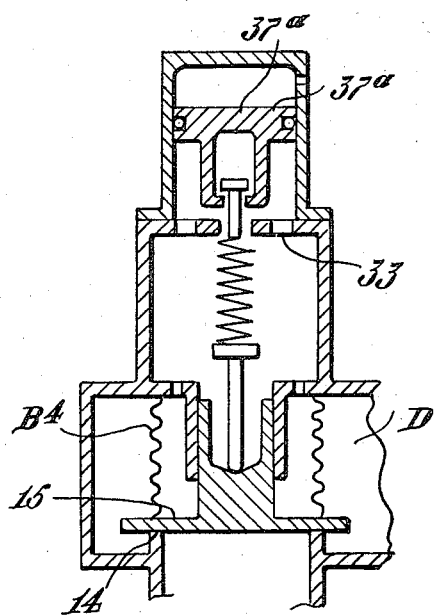

Fig. 11 is a view generally similar to Fig. 9, but showing an arrangement in which the area of the bellows floor is equal to that of the valve seat; and, Fig. 12 is a view generally similar to Fig. 9, but showing a valve having a closed or non-vented bonnet and wherein the area of the bellows floor equals the area of the valve seat, and which is provided with a pressure equalizing piston whose effective area is equal to that of the bellows floor.

Referring to the drawings and in particular to Fig. 1 the numeral 10 designates the body or casing of a safety valve embodying the present invention. As shown in Fig. 1 the valve casing 10 is provided with an inlet 11 for pressure fluid, the inlet being defined by a throat tube or nozzle 12 which fits within a bore in the casing proper. The casing has the outlet passage 13 leading from an interior chamber D within which is the annular valve seat 14, here shown as at the upper end of the throat tube or nozzle 12. The valve head or disk 15 normally engages the seat 14 to close the passage 11. As here illustrated the valve head or disk 15 is provided with a short, axial, upwardly extending boss or stem which has swivel connection with the valve holder 16. This holder has a chamber or cavity for the reception of the valve head and is shaped to cooperate with the blow-down ring R in controlling the popping and closing of the valve. The holder 16 has the upwardly extending cylindrical stem portion 17 which slides in a fixed guide sleeve 18, here shown as integral with an annular plate 19 whose marginal portion rests on a horizontal seat surface formed in the flange 20 at the top of the casing 10. This plate 19 is clamped in place by the base flange 21 of the bonnet device 22, the flange 21 being secured to the flange 20 of the valve body by suitable bolts. The bonnet 22 is provided with the top closure portion 23 and defines the chamber C (whose floor is formed by the plate 19) through which passes the valve loading spindle 24 having near its lower end the abutment member 25 on which rests the lower end of the helical loading spring 26. The upper end of this loading spring engages the vertically adjustable abutment member 27 having a central opening through which the stem 24 passes. A vertically adjustable gland 28 has threaded engagement with the wall of a central bore in the top closure 23 of the bonnet. The upper portion of the spindle 24 passes through this gland. The lower end of the spindle 24 is swivelly connected to the upper end of the stem 17 of the disk holder 16 and is loosely retained by a circularly shaped spring-ring 24ª.

A ring 29 is secured to the holder 16 in concentric relation to the latter, for example, by screw threads and desirably with interposed packing 30 to insure a leak-tight joint. The lower end of a metallic protective bellows B is secured to the ring 29, for example, by brazing, welding or soldering, so as to form a leak-tight connection. The upper end of this bellows device is turned outwardly to form a substantially horizontal flange whose marginal portion is clamped (desirably with interposed packing 32) between the undersurface of the plate 19 and the horizontal surface of the casing 10 on which the plate 19 rests. Desirably one or more passages 33 in the plate 19 provide communication between the chamber C and the interior of the protective bellows B. The bellows device B as thus arranged is effective, normally, to prevent pressure or pressure fluid within the chamber D from following the stem 17 up into the chamber C within the bonnet. Thus if the pressure fluid which is being handled by the valve is of a corrosive, poisonous or otherwise hazardous nature, the protective bellows, when properly functioning, will prevent such pressure fluid from passing into the bonnet where it might damage the loading spring, foul the guiding surfaces or produce a pressure within the valve casing such as to prevent the valve from opening at the set pressure. A threaded hole V (Fig. 1ª) may be provided in the bonnet 22 to receive a pressure-sensitive telltale or gauge (not shown) for determining whether or not the bellows assembly is leak-proof. During normal operation this hole is closed by a threaded plug 22ª.

In valves of the above type wherein a protective bellows is employed, it is customary, in assembling the parts, to elongate the bellows, for example, by an amount approximately equal to one-half the maximum lift of the valve, whereby when the valve pops the bellows will not be subjected to so sudden and serious a compressive stress, thus prolonging its life.

It is obvious that when the valve disk 15 is lifted from its seat, pressure fluid will flow into the space D surrounding the bellows B. This may also occur even when the valve 15 is seated if, as illustrated for example in Fig. 8, several valves S, S¹ and S² are arranged to discharge into the same header H. If the header be of great length or if the free discharge of fluid therefrom be otherwise restricted, the opening of one valve may occasion back pressure in the other valves such that these other valves will not open at the set pressure unless these other valves are equipped with non-defective protective bellows such as herein described.

Figure 10:
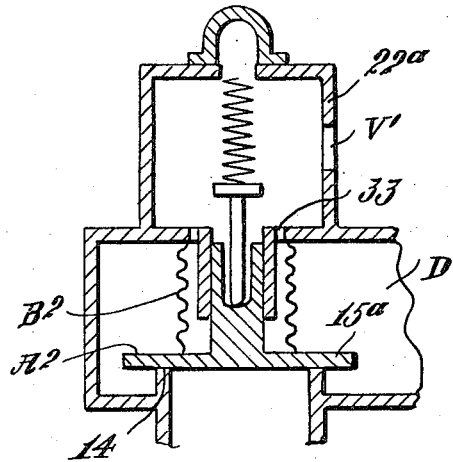
Fig. 10 is a view similar to Fig. 9, but showing an arrangement in which the area of the bellows floor is less than that of the valve seat.

The influence of such back-pressure in the space D is diagrammatically illustrated in Figs. 9, 10 and 11. In Fig. 9, a simple valve disk 15ª is shown resting upon a seat 14ª whose internal area is assumed to be 1 square inch. The disk overhangs the seat so that there is an area A' at the underside which is exposed to pressure in the chamber D. The entire upper surface of the disk 15ª is cut off from the chamber D by the bellows B'. The area of the upper surface of the disk within the bellows is assumed to be 1.5 square inches. It is further assumed that the disk is held down on its seat by a spring force of 100 lbs., providing a set pressure such that the valve disk will begin to rise when the pressure within the seat exceeds 100 lbs. per square inch, it being further assumed that the bonnet 22ˣ has a vent V' and that, under normal conditions, the pressure in the chamber D is atmospheric (that is to say, 0.0 gauge pressure). If now a back-pressure of 25 lbs. per square inch develops in the chamber D, an unbalanced force will act against the underside of the valve disk at A', the area of this part of the disk being 1.5–1.0 which equals 0.5 square inch. The back-pressure of 25 lbs. per square inch acting on the area A' thus creates a force of 12.5 pounds per square inch acting upwardly, so that, in this case, the valve will lift before the set pressure of 100 lbs. is reached.

In Fig. 10, the reverse effect is illustrated. In this view, the bellows B² is of a diameter less than that of the seat, for example such that the floor of the bellows has an area of 0.5 square inch, the seat area still being 1.0 square inch. Since equal areas of the upper and lower surfaces of the disk 15 are exposed where the disk overhangs the seat, these areas may be disregarded and only the area at the upper side of the disk between the inner edge of the seat and the bellows need be considered. Since the area within the bellows has been assumed to be 0.5 square inch and the area of the seat is 1.0 square inch, the exposed area at the upper surface of the disk outside of the bellows which is effective is 0.5 square inch. If now back-pressure develops in the chamber D to the value of 25 pounds per square inch, there is thus a downward pressure on the disk of 25×0.5 which equals 12.5 pounds per square inch acting downwardly, this force being added to the spring force so that the valve will not lift at the set pressure.

In the arrangement shown in Fig. 11, the area of the upper surface of the valve disk which forms the floor of the bellows B³ is equal to the internal area of the valve seat 14', and equal areas of the upper and lower surfaces of the disk, overhang the valve seat. Thus, in this arrangement, there is no differential area to be affected by pressure variations in the chamber D so that, under static conditions and assuming that the bellows remains intact, the valve will begin to rise from its seat as soon as the set pressure is exceeded.

It is thus evident that so long as the bellows remains intact, the bonnet is properly vented to the atmosphere, and static conditions prevail, the size of the floor of the bellows (that is to say, the size of the valve disk which is exposed within the bellows) relatively to the area of the valve seat, definitely determines whether or not the valve shall lift at the set pressure.

The above results are made on the assumption that the bellows is intact and leak-tight. However, referring again to Fig. 9, if the bellows B' develop a pin-hole leak or a fracture whose effective area is less than that of the holes 33 and/or the vent V', there will be no resultant effect on the popping pressure since the small quantity of pressure fluid which enters the bellows and the valve bonnet will escape so as not substantially to increase the pressure therein. However, if the fracture in the bellows exceeds the area of the holes 33 and/or the vent V', pressure will build up within the bellows producing, in effect, an increase in the spring force and thus delaying valve lift, this added downward force depending upon the ratio of the fracture area and the areas of the holes 33 and/or the vent V'. Similar effects will be observed in the arrangements shown in Figs. 10 and 11 since, in each instance, the holes 33 provide communication between the interior of the bellows and the interior of the bonnet and the bonnet is provided with a vent to the atmosphere. It will be observed that to avoid the development of abnormal force on the valve disk under back-pressure conditions within the chamber D, it is essential that the area of the vent V' in the bonnet be sufficiently great to prevent the build-up of appreciable super-atmospheric pressure within the bonnet even though the bellows be substantially destroyed. But, as above noted, the presence of any open vent in the bonnet wall is to be avoided if possible.

While the bellows B normally prevents transmission of pressure or pressure fluid from the interior of the valve casing into the bonnet chamber C, it is quite possible that the bellows may become defective for one reason or another so that pressure or pressure fluid may be able to enter the bonnet chamber C.

The present invention makes it possible to employ a non-vented bonnet while, at the same time, providing for substantially neutralizing the effects of the fortuitous entry of pressure into the interior of the bellows and into the bonnet and which is effective not only under static conditions but also under the conditions prevailing, after the valve disk begins to rise from its seat.

According to the present invention provision is made for substantially neutralizing the effects of the fortuitous entry of pressure fluid into the interior of the bellows B and the chamber C. For this purpose for example, as illustrated in Fig. 1, there is mounted on the upper end of the bonnet 22 a vertical, elongate, cylindrical cap or auxiliary bonnet 34 having a radial flange 34ª at its lower end which is connected by bolts 35 to the top member 23 of the bonnet 22, with an interposed gasket 34ᵇ to prevent leakage. The upper end of the cap is formed by a removable member 34ᶜ held in place by a set screw 34ᵈ and having a vent passage T¹ leading out from the upper part of the cap 34. Within this cylindrical cap 34 there is arranged a piston 37, here shown as having a packing ring 38, for example, of graphite, which makes sliding contact with the inside surface of the cylinder 34. This piston 37 (Figs. 2 and 3) has a downwardly extending segmental hollow body portion 39 of less diameter than the piston proper and having a bottom wall 40 provided with a radial slot 41 (Fig. 3) through which the upper end 24ª of the loading spindle 24 passes freely, with clearance, into the chamber 39ª within the body 39 of the piston. Within this chamber the upper end 24ª of the spindle 24 is provided with a stop or abutment (here shown as a nut N) of a size such that it cannot pass down through the slot 41 in the bottom wall 46. The axial length of the chamber 39ᵃ equals or exceeds the maximum lift of the valve disk 15 from its seat. It will be apparent that with this arrangement the piston 37 will not be moved by the spindle 24 from the position shown in Fig. 1 (where the piston is supported by the limiting stud 37ᵃ) during the normal operation of the valve (that is, so long as the bellows B remains intact). With this arrangement, if pressure fluid enter the chamber C² in the cap 34, it will act upon the piston 37 and raise the latter so that the part 40 will, by engagement with the nut N, exert upward force on the spindle 24.

Where the spindle 24 passes through the gland 28, the spindle (or the gland) is dimensioned to provide a passage through which pressure fluid from the bonnet chamber C may pass freely up into the chamber C² in the cylindrical cap 34, so as to act upwardly against the piston 37. The area of the piston 37 is such, as compared with the effective area of the floor of the interior space bounded by the wall of the bellows B (such floor being formed in part by the ring 29 and in part by the valve holder 16) that when pressure fluid enters the bellows B because of the rupture of the bellows wall and thence flows up through the chamber C and into the chamber C², the upward force exerted by such pressure fluid against the piston 37 will substantially balance downward force exerted by such pressure fluid against the floor of the space within the bellows B. Thus, even though the bellows B should break or develop a leak, there is no danger that the operation of the valve will thereby be substantially affected.

The packing ring 38 normally prevents pressure fluid in the cap 34 from escaping to the atmosphere through the vent port T¹ and likewise prevents atmospheric gases of corrosive nature from entering the bonnet and damaging the spring 26.

While, as shown in Fig. 1 and solely for clarity in illustration, there is substantial clearance between the exterior of the fixed guide sleeve 17 and the inwardly directed ribs of the protective bellows B, in actual practice this clearance is made as small as is possible without interfering with the expected longitudinal expansion or contraction of the bellows. When the parts are so proportioned, the sleeve 17 acts to prevent any appreciable lateral motion of the side wall of the bellows, thus guarding against excess lateral movement of the bellows with consequent weakening of the bellows.

Figure 4:
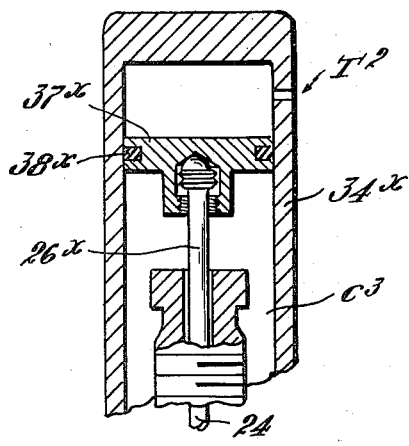
Fig. 4 is a fragmentary vertical section through the cap or auxiliary bonnet showing a balancing piston connected directly to the valve spindle without provision for substantial lost motion.

In the arrangement shown in Fig. 4, a modification is illustrated wherein the cap 34ˣ is of unitary construction, having the internal chamber C³ in which slides the piston 37ˣ having the packing ring 38ˣ. In this arrangement, the upper end 26ˣ of the valve loading spindle 24 is connected by conventional swivel means directly to the piston 37ˣ. A vent hole T² is provided above the piston. This arrangement provides a somewhat simpler construction than that illustrated in Fig. 1.

Figure 5:
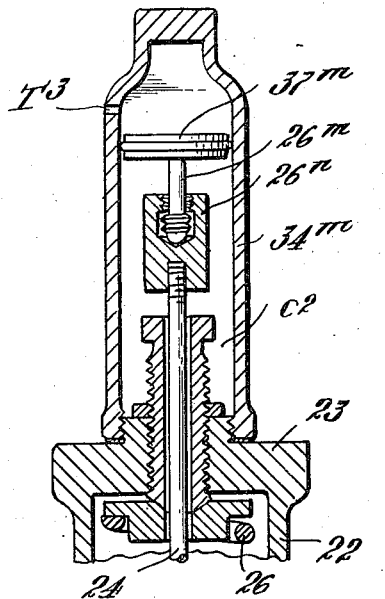
Fig. 5 is a view generally similar to Fig. 4 but illustrating another mode of connecting the balancing piston to the valve spindle.

In Fig. 5, a further modification is illustrated wherein the unitary cap 34ᵐ has screw-threaded engagement at its lower end with a threaded boss integral with the top member 23 of the valve bonnet 22, with a gasket interposed between the lower end of the cap and the part 23 so as to prevent leakage. A piston 37ᵐ slides within the chamber C² in the cap. The cap is vented at T³ above the piston and the stem 26ᵐ of the piston is swiveled to a connector 26ⁿ which is screw-threaded directly to the upper end of the valve spindle 24.

Figure 6:
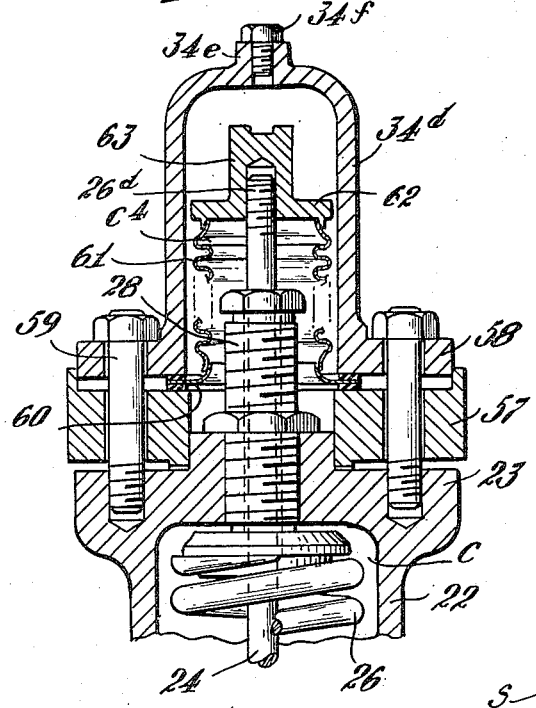
Fig. 6 is a fragmentary vertical section through the cap and the upper portion of the valve bonnet proper, illustrating the use of a bellows within the cap in place of the balancing piston shown in the preceding figures.

In Fig. 6, a still further modification is illustrated wherein a heavy annulus 57 is arranged to seat, with an interposed gasket, upon an upper surface of the top 23 of the valve body 22. The radial base flange 58 of a protective cap 34ᵈ seats an annular channel in the upper surface of the part 57, the flange and annulus being secured in assembled relation to the valve bonnet by bolts or studs 59. Between the flange 58 and the annulus 57 there is clamped, leak-tight (with interposed gaskets) a radial flange 60 integral with the lower end of the side wall of a metallic balancing bellows 61 whose upper end is secured leak-tight to the vertically movable, disk-like head 62 having an internally threaded upwardly directed boss 63 which receives the upper screw-threaded end 26ᵈ of spindle 24. The space C⁴ within the balancing bellows 61 communicates, by means of a passage extending through the gland 28, with the chamber C in the valve bonnet 22 so that any leakage of high pressure fluid into the valve bonnet, acting against the underside of the movable head 62 of the bellows 61, is operative to counterbalance pressure of such fluid acting against the lower head of the protective bellows B (not shown in Fig. 6). The cap 34ᵈ has an integral boss 34ᵉ at its upper end. This boss is provided with a screw-threaded bore normally closed by a threaded plug 34ᶠ. By removing the plug, pressure fluid may be admitted to the interior of the cap for testing the balancing bellows.

Figure 8:
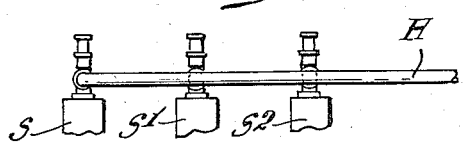
Fig. 8 is a fragmentary diagrammatic elevation showing a plurality of safety valves connected to a common discharge header.

As already remarked, when valves of this type are arranged in a battery to discharge into the same header, as illustrated in Fig. 8, so that under some circumstances a substantial back pressure may exist within the casing of a closed valve, the expansion forces developed when such valve itself actually opens are so modified that the kinetic force (which is developed, at opening, when only atmospheric pressure is present within the casing of the closed valve) does not have a chance to develop, so that the popping of the valve at the set pressure is delayed and this delay increases in proportion to the amount of back pressure in the casing. Thus, in a bellows valve of this type, in which the area of the lower head of the protective bellows actually equals the area of the valve seat (as illustrated in Fig. 11), the pop action of the valve may, under high black-pressure conditions be delayed beyond acceptable limits of over-pressure (accumulation) and may require still higher over-pressure to obtain a lift high enough to develop its rated capacity for the existing conditions of flow. Simple static-pressure balancing of areas is not in itself enough to attain overall acceptable performance under flow conditions and would result in low lifts with consequent reduced capacity. Therefore, in order to obtain higher capacity under back-pressure conditions and maintain the capacity as close as possible to that at which the valve is rated, under atmospheric conditions (low back-pressure), it has been found highly desirable that the floor of the bellows exceed the area of the valve seat. Thus, in a preferred embodiment of the present invention and in order to overcome this deficiency, the effective area of the movable head of the protective bellows which is exposed within the bellows is substantially increased, as diagrammatically illustrated in Fig. 9, so as to exceed the area of the valve seat and thus insure capacity ratings within safe limits of over-pressure, it being noted that a maximum over-pressure of 10% is all that is permitted by the Code. Numerous tests have indicated that the effective area of the bellows floor be approximately 15% (+5%/—2%) greater than the area of the valve seat gives the best overall results. Substantially higher percentages of oversizing may result in earlier opening pressures under back-pressure conditions than are acceptable; while, substantially smaller percentages of oversizing may reduce the capacity under back-pressure conditions to an undesirable amount.

As may be understood from the above description, a compromise must be reached to obtain acceptable results in balanced bellows construction valves. The addition of supplementary pistons or bellows does not, in any way, enter into the basic operation of the so-called balanced bellows valves inasmuch as the supplementary pistons or bellows does not come into action until after the bellows have failed; but, when used, such supplementary pistons or bellows must be oversized to the same extent as the primary bellows in order that they may accomplish the desired function. Thus, in accordance with the present invention, the effective area of the movable head of the balancing means (bellows or piston) which is exposed when the protective bellows fails, is similarly greater than the area of the valve seat so as to match that of the movable head of the bellows.

Such an arrangement is illustrated in Fig. 1 wherein the floor of the protective bellows is shown as approximately 15% greater in area than the valve seat and the pressure-neutralizing piston 37ª is of the same area as the floor of the bellows B⁴. This insures safe operation of the valve at full capacity even though working against a substantial back-pressure.

In the arrangement shown in Fig. 12 where the area of the floor of bellows B⁴, the area of piston 37ª and the area of the valve seat are equal, and the bonnet is non-vented below the piston 37 but open to the atmosphere above the piston at the port V², the only effective forces normally acting on the valve disk are the 100 lb. spring load and the upward fluid pressure of 100 lbs. within the valve seat, the parts being statically balanced. If the bellows B4 is ruptured, no unbalanced forces result, since the area of the piston 37ª and the area of the valve seat are equal, and thus the valve still begins to lift at the popping point as before even though back-pressure subsists in the chamber D. However, to provide for flow conditions such as exist immediately after the valve begins to lift, the area of the bellows floor should exceed that of the valve seat as above described.

Figure 7:
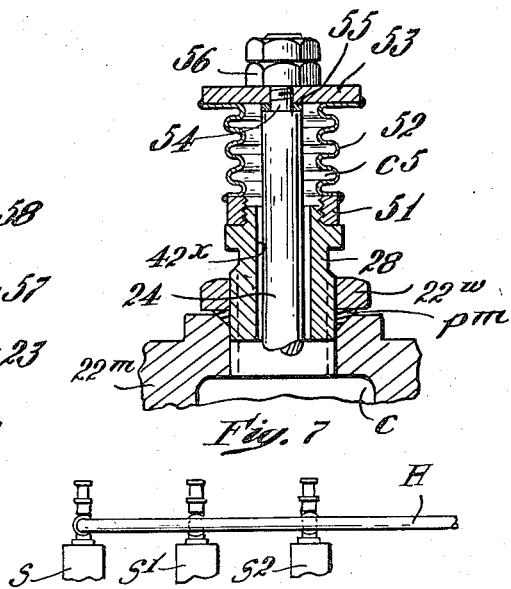
Fig. 7 is a fragmentary vertical section illustrating a balancing bellows connected to the valve spindle but without any enclosing cap.

In Fig. 7, a further modification is illustrated which dispenses with a cap such as the cap 34. In this arrangement a ring 51 is connected leak-tight to the upper end of the gland 28. The lower end of the wall of a balancing bellows 52 is secured leak-tight to this ring 51 while the upper end of the bellows wall is secured leak-tight to a movable bellows head 53. This head 53 is provided with a central aperture through which the reduced upper end 54 of the loading spindle 24 passes, the head 53 being secured with interposed packing 55 to the spindle by means of a nut 56. The interior chamber C⁵ of the balancing bellows 52 communicates with the chamber C of the valve bonnet 22ᵐ by a suitable passage 42ˣ, such as above-described, through the gland 28, so that the head 53 of the bellows is exposed to any pressure fluid which enters the interior of the protective bellows B from the chamber C. As illustrated, a packing ring $p^m$ is arranged in an annular recess in the upper surface of the top portion of the bonnet 22ᵐ and a compression lock nut 22ʷ, engaging the threaded gland, compresses the packing to provide a leak-tight joint. Since the head 53 is secured to the spindle 24 and as the effective area of the under-surface of the head 53 is properly related to the area of the movable lower head of the protective bellows B, pressure fluid entering the chamber C⁵ counterbalances that force which tends to hold the valve against its seat.

The use of a balancing bellows such as shown, for example, in Figs. 6 and 7, as contrasted with the use of a balancing piston, has the advantage of providing a completely mechanical seal preventing escape of back pressure to the atmosphere due to possible deterioration such as might be encountered with an O-ring seal; and, with such a bellows there is no possibility of frictional interference such as might occur over an extended period of time with a piston and O-ring seal; and, a metallic bellows can withstand much higher operating temperatures than an O-ring of usual materials.

Obviously, if desired, lost motion connections, similar in function to the means for connecting the piston 37, to the spindle 34 (Fig. 1) may be provided between the pistons of the devices shown in Figs. 4 or 5 and the corresponding valve spindles, or between the upper movable heads of the balancing bellows shown in Figs. 6 or 7 with their corresponding valve spindles.

Obviously, if leakage into the space above the piston (shown in Figs. 1, 4 or 5 for example) should become excessive, a suitable pipe could be connected to the cap to receive fluid escaping from the corresponding vent port T¹, T² or T³ to carry such fluid away to a safe point of discharge.

It should further be noted that each of the several embodiments of the invention here illustrated places the balancing element (piston or bellows) completely outside of the valve casing or bonnet proper, so that the balancing means is readily accessible for repairs or replacement without interrupting the normal functioning of the valve or disturbing the adjustment of the loading spring.

While certain desirable embodiments of the invention have herein been disclosed by way of example, it is to be understood that the invention is broadly inclusive of any and all modifications falling within the scope of the appended claims.

I claim:

1. In a spring-loaded pop safety valve having a casing which houses a valve seat and a valve disk and a pressure tight bonnet which houses a valve loading spring, the valve also comprising a spindle extending upwardly into the bonnet, and protective means normally operative to prevent super-atmospheric pressure, present in the valve casing above the valve seat, from entering the bonnet, in combination, means, located outside of the bonnet proper, operative automatically to neutralize downward force tending to oppose lift of the valve disk from its seat resultant from a disabling of the protective means.

2. In a spring-loaded pop safety valve having a casing which houses a valve seat and a valve disk, and which includes a pressure tight bonnet which houses a valve loading spring and wherein a valve spindle extends up from the valve disk into the bonnet, and protective means, including an annular wall, expansible and contractable in length, extending from the valve disk to the floor of the bonnet, which is coaxial with the valve disk, and which is normally operative to prevent super-atmospheric pressure, present in the valve casing above the valve seat, from entering the bonnet, in combination, fluid-actuated means, located beyond the confines of the casing and bonnet proper, operative to neutralize downward force tending to oppose lift of the valve disk from the seat, exerted by pressure fluid which fortuitously enters the interior space bounded by said annular wall.

3. In a spring-loaded safety valve having a casing which houses a valve and valve disk, and which has a stem extending from the valve disk into a bonnet mounted on the valve casing, the interior of the bonnet having a floor, the bonnet being sealed to the outside atmosphere, the bonnet housing a valve loading spring, a metallic protective bellows whose annular lower end is connected to the valve disk and whose upper end is fixed leak-tight to the floor of the bonnet and which is normally operative to prevent super-atmospheric pressure, present in the valve casing above the valve seat, from entering the bonnet, in combination, means which is accessible, without disturbing the setting of the loading spring, operative automatically to exert upward force on the valve spindle sufficient substantially to neutralize downward force exerted on the valve disk by super-atmospheric pressure which fortuitously subsists within the interior of said protective bellows.

4. A spring-loaded pop safety valve according to claim 3 wherein the means for exerting upward force on the valve disk is located outside of the valve casing and bonnet proper.

5. A spring-loaded pop safety valve according to claim 3 wherein the means for exerting upward force on the valve disk is arranged within a cap attached to the top of the bonnet proper.

6. A spring-loaded safety valve according to claim 3 wherein the means for exerting upward force on the valve disk is so located and constructed and so connected to the valve spindle that it may be installed or removed without cutting off the supply of pressure fluid to the valve.

7. The combination of claim 3 wherein the means for exerting upward force on the valve spindle comprises a piston arranged within a cylinder external to and mounted upon the valve bonnet proper in coaxial relation to the valve disk, means for connecting the piston to the valve spindle, the valve comprising means whereby super-atmospheric pressure, subsisting within the protective bellows, is transmitted to act on said piston.

8. A spring-loaded pop safety valve according to claim 3 wherein the means for exerting upward force on the valve disk comprises a piston arranged to slide in a cylindrical cap mounted on top of the bonnet proper, the space within said cap, above the piston, being vented to the atmosphere.

9. The combination according to claim 3, wherein the means for exerting upward force on the valve spindle comprises a metallic balancing bellows, external to and mounted upon the valve bonnet proper, said bellows having a movable head connected to the valve spindle, the safety valve comprising means whereby superatmospheric pressure, subsisting within the protective bellows, is transmitted to act on the movable head of the balancing bellows.

10. The combination according to claim 3 wherein the means for exerting upward force on the valve stem comprises a metallic balancing bellows mounted upon the valve bonnet in coaxial relation to the valve disk, the interior of the balancing bellows being in free communication with the interior of the protective bellows, said balancing bellows having a movable head and means connecting said movable head of the balancing bellows to the valve spindle, the area of the inner surface of said movable head of the balancing bellows being such that pressure fluid acting thereon develops an upward force substantially equal to the downward force exerted by said pressure fluid upon the floor of the space bounded by the wall of the balancing bellows.

11. A spring-loaded pop safety valve of the kind in which a valve casing, provided with inlet and outlet passages houses a valve seat and a valve disk, and wherein a bonnet, mounted on the valve casing and having a floor provided with a central opening, defines a chamber, closed to the outer atmosphere, within which a loading spring is arranged, a valve spindle whose lower end is connected to the valve disk and which extends up through the opening in the floor of the bonnet chamber, and means normally operative to prevent pressure fluid from passing from the interior of the casing into the bonnet chamber through said opening in the floor of said chamber, characterized in having a fluid-pressure motor, located outside of the casing and bonnet, operative to counterbalance any abnormal downward force tending to oppose lift of the valve from the seat incident to the fortuitous entry of pressure fluid into the bonnet chamber.

12. A spring-loaded pop safety valve of the kind in which a valve casing provided with inlet and outlet passages houses a valve seat and a valve disk, and wherein a bonnet, mounted on the valve casing and having a floor provided with a central opening, defines a chamber, closed to the outer air, in which a loading spring is arranged, a valve spindle whose lower end is connected to the valve disk and which extends up through the opening in the floor of the bonnet chamber, and means normally operative to prevent pressure fluid from passing from the interior of the valve casing into the bonnet chamber through said opening in the floor of said chamber, characterized in having a movable balancing part, located outside of the valve casing and bonnet, which is guided to move axially in the direction of the length of the valve spindle, and which is exposed to fluid pressure resultant from the fortuitous entry of pressure fluid into the bonnet chamber, said balancing part being so arranged that it tends to move away from the valve seat in response to such pressure, and means connecting said part to the valve spindle.

13. A spring-loaded pop safety valve of the kind in which a valve casing, provided with inlet and outlet passages, houses a valve seat and a valve disk, and wherein a bonnet mounted on the valve casing and having a floor provided with a central opening, defines a chamber, closed to the outer air, within which a loading spring is arranged, a valve spindle whose lower end is connected to the valve disk and which extends up through the opening in the floor of the bonnet chamber, and means normally operative to prevent pressure fluid from passing from the interior of the casing into the bonnet chamber through said opening in the floor of said chamber, characterized in having a movable balancing element which is guided to move axially of the valve spindle and which is exposed to fluid pressure resultant from the fortuitous entry of pressure fluid into the bonnet chamber, said balancing element being located outside of the bonnet and being so arranged that it tends to move away from the valve seat in response to such pressure, and means for transmitting motion from said balancing element to the valve spindle, said motion transmitting means being so constructed and arranged as to permit normal opening and closing of the valve without corresponding motion of the balancing element.

14. A spring-loaded pop safety valve according to claim 13 further characterized in having means operative to limit downward motion of the balancing element.

15. A safety valve according to claim 13 wherein the motion transmitting means comprises a part which is fixed relatively to the balancing element and a part which is fixed realtively to the valve spindle, said parts being normally spaced a distance at least as great as the maximum lift of the valve disk from its seat, but being so disposed that they are brought into engaging contact when the balancing element moves upwardly a predetermined distance from its normal position.

16. A safety valve according to claim 13 wherein the balancing element has a vertically elongate hollow body portion having a bottom provided with an opening through which the upper portion of the valve spindle passes loosely, and an enlargement at the upper end of the valve spindle of a size such that it cannot pass through said opening, the space within the hollow body portion being of a length exceeding the maximum lift of the valve disk from its seat.

17. A spring-loaded pop safety valve of the kind in which a valve casing, provided with inlet and outlet passages, houses a valve seat and a valve disk, and wherein a bonnet, mounted on the valve casing, and having a floor provided with a central opening, defines a chamber, closed to the outer air, within which a loading spring is arranged, a valve spindle whose lower end is connected to the valve disk and which extends up through the opening in the floor of the bonnet chamber, and means normally operative to prevent pressure fluid from passing from the interior of the case into the bonnet chamber into the opening in the floor of the said chamber, characterized in having a cylinder mounted on the top of the bonnet proper and a piston slidable in said cylinder, the interior of the cylinder communicating with the bonnet chamber, the effective area of the underside of the piston being such that pressure fluid acting thereon develops an upward force operative substantially to counterbalance any abnormal downward force tending to oppose lift of the valve from its seat incident to the fortuitous entry of pressure fluid into the bonnet chamber, and means connecting the piston with the valve spindle.

18. A spring-loaded pop safety valve of the kind in which a valve casing, provided with inlet and outlet passages, houses a valve seat and a valve disk, and wherein a bonnet mounted on the valve casing and having a floor provided with a central opening defines a chamber, closed to the outer air, within which a loading spring is arranged, a valve spindle whose lower end is connected to the valve disk and which extends up through the opening in the floor of the bonnet chamber, and means normally operative to prevent pressure fluid from passing from the interior of the casing into the bonnet chamber through said opening in the floor of said chamber, characterized in having a balancing bellows associated with but exterior to the bonnet, the lower end of said bellows being attached leak-tight to the bonnet, the bellows having a head at its upper end which is movable toward and from the valve seat, the interior of said bellows communicating with the bonnet chamber, and means connecting the movable head of the bellows with the valve spindle.

19. A safety valve according to claim 13 wherein the valve spindle extends out through an opening in the top of the bonnet proper, the movable head of the balancing bellows being rigidly secured to the valve spindle, an annular part concentric with the valve spindle to which the lower end of the balancing bellows is secured, and means detachably uniting said annular part leak-tight to the top of the bonnet proper, said annular part having an interior chamber which communicates with the interior of the balancing bellows and which also communicates with the interior of the bonnet.

20. A spring-loaded pop safety valve of the kind having a casing providing a chamber within which is an annular valve seat and from which a discharge passage leads, a valve disk which normally rests on the seat and a holder for the valve disk, the holder having a rigid stem, a fixed cylindrical guide sleeve in which the stem slides, the lower end of the sleeve being above the level of the valve seat and the sleeve being long enough to guide the valve holder throughout its entire travel, a hollow bonnet mounted on the valve casing, said bonnet being normally sealed against the entry of atmospheric air, means constituting a floor for the chamber within the bonnet, and a protective bellows coaxial with the guide sleeve, the upper end of the bellows wall being secured leak-tight to the bonnet floor, said floor having a passage providing communication between the interior of the bonnet and the interior of the bellows, and the lower end of the bellows wall being attached leak-tight to the valve holder, the outside diameter of the fixed guide sleeve being such, as compared with the diameter of the inwardly directed ribs of the protective bellows, that the guide sleeve prevents appreciable lateral movement of the bellows wall when the valve opens, a valve-loading spindle connected at its lower end to the stem of the valve holder, and a loading spring within the bonnet which urges the spindle downwardly with resilient force, characterized in having balancing means located above the upper end of the loading spring and connected to the upper portion of the spindle, and which is automatically operative to exert upward force on the spindle in the event that super-atmospheric pressure within the valve casing gains access to the interior of the protective bellows.

21. A spring-loaded pop safety valve, according to claim 20, wherein the balancing means comprises a movable element connected to the upper portion of the spindle and which is normally shielded from the pressure subsisting in the valve casing above the valve seat but which is exposed to pressure subsisting within the interior of the protective bellows whereby, when the pressure within the protective bellows rises to an abnormal degree, force is exerted on said movable part tending to lift the valve from its seat.

22. A spring-loaded safety valve, according to claim 20, wherein the balancing means is located outside of the casing and bonnet and comprises a movable part connected to the spindle and which is exposed to the pressure which, at any time, subsists within the protective bellows.

23. A spring-loaded safety valve, according to claim 20, wherein the balancing means comprises a vertically movable piston arranged within a cylinder external to the valve bonnet, the piston being connected to the upper end of the valve spindle and being always exposed at its lower side to the pressure which, at any time, subsists within the protective bellows, and at its opposite side to atmospheric pressure.

24. A spring-loaded safety valve, according to claim 20, wherein the balancing means comprises a metallic bellows coaxial with the spindle and external to the valve bonnet, said bellows having a movable head connected to the upper end of the spindle and which is always exposed at its underside to the pressure which, at any time, subsists within the protective bellows.

25. A spring-loaded safety valve according to claim 24, wherein the balancing bellows is housed within a cap which is normally air-tight, said cap having a normally closed port which may be opened to admit pressure fluid to the cap for testing the balancing bellows.

26. A spring-loaded safety valve according to claim 3, further characterized in that the effective area of the movable head of the protective bellows which is exposed within said bellows exceeds the effective area of the valve seat by an amount of from 5% to 30%.

27. A spring-loaded valve according to claim 12, further characterized in that the effective area of that side of the movable balancing part which is exposed to the pressure subsisting within the protective bellows and the effective area of the movable head of the protected bellows each exceeds the effective area of the valve seat by approximately the same amount.

28. A safety valve having a casing which houses a valve seat and a valve disk and which has a loading spring which holds the disk in contact with the seat until fluid, at a predetermined popping pressure, acts to initiate lift of the disk from its seat, and a metallic bellows coaxial with the valve seat whose lower end is fixed relatively to the disk and whose upper end is fixed to a part of the casing thereby defining a chamber above the valve disk from which pressure fluid escaping over the valve seat is normally excluded, the floor of said chamber within the bellows being of an effective area which exceeds the area of the valve seat by approximately 15% and means operative to balance super-atmospheric pressure, acting upon the upper side of the valve disk, resultant from leakage of the bellows.

29. A spring-loaded, pop safety valve of the kind wherein a casing provides a chamber within which the valve seat is located, a valve disk which normally rests on the seat, a valve holder having a stem coaxial with the valve seat, a non-vented bonnet having a floor provided with a circular opening and which is fixed to the casing, a loading spring within the bonnet and means for transmitting force from the spring to the stem of the valve holder, a protective bellows within the casing, said bellows having a ribbed wall whose upper end is secured leak-tight to the floor of the bonnet and whose lower end is connected leak-tight to the holder, characterized in that the floor of the chamber within the bellows is of an effective area which exceeds that of the valve seat, and in having means located outside of the bonnet which is operative, automatically, to exert upward force upon the stem of the valve holder in the event that super-atmospheric pressure gains access to the interior of the bellows.

30. A spring-loaded, pop safety valve, according to claim 7, wherein the floor of the bellows is of an area exceeding that of the valve seat, and the area of the piston is equal to that of the floor of the bellows.

31. A spring-loaded, pop safety valve, according to claim 9, wherein that section of the valve disk which is within the bellows is of an area exceeding that of the valve seat and the movable head of the balancing bellows is equal to said area of the valve disk.

32. A spring-loaded pop safety valve having a casing within which is located a valve seat, a movable valve head, a holder to which the head is secured, said holder having a stem, fixed means for guiding the stem, a spindle connected at its lower end to the stem of the valve holder, a bonnet secured to the valve casing, the bonnet being normally sealed against entry of atmospheric air, guard means normally preventing the entry of pressure fluid from within the valve casing into the bonnet, a loading spring arranged within the bonnet and which urges the spindle downwardly so as normally to hold the valve head against the seat, balancing means attached to the upper part of the spindle, said balancing means being located above the loading spring, the balancing means being so constructed and arranged that if said guard means fail and permits pressure from within the casing to enter the bonnet, the balancing means will become effective to exert upward force on the spindle in opposition to the action of the loading spring.

References Cited in the file of this patent

UNITED STATES PATENTS

| | | |
|---|---|---|
| 2,264,656 | Briscoe | Dec. 2, 1941 |
| 2,414,794 | Bergquist | Jan. 28, 1947 |
| 2,821,208 | Farris | Jan. 28, 1958 |